US008931229B2

(12) United States Patent
Wiercinski et al.

(10) Patent No.: US 8,931,229 B2
(45) Date of Patent: *Jan. 13, 2015

(54) WATERPROOFING MEMBRANE

(75) Inventors: Robert A. Wiercinski, Lincoln, MA (US); Anandakumar Ranganathan, Lexington, MA (US); Xia Cao, Acton, MA (US); Robert Paul, Maynard, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/642,292

(22) PCT Filed: Apr. 5, 2011

(86) PCT No.: PCT/US2011/031158
§ 371 (c)(1),
(2), (4) Date: Jan. 15, 2013

(87) PCT Pub. No.: WO2011/139455
PCT Pub. Date: Nov. 10, 2011

(65) Prior Publication Data
US 2013/0104495 A1  May 2, 2013

Related U.S. Application Data

(60) Provisional application No. 61/328,899, filed on Apr. 28, 2010.

(51) Int. Cl.
*E04B 1/66* (2006.01)
*C09J 7/02* (2006.01)
(Continued)

(52) U.S. Cl.
CPC ............... *E04B 1/665* (2013.01); *C09J 7/0207* (2013.01); *C09J 7/0228* (2013.01); *E01D 19/083* (2013.01);
(Continued)

(58) Field of Classification Search
USPC ..................... 52/408, 411; 428/351
See application file for complete search history.

(56) References Cited

U.S. PATENT DOCUMENTS 2,760,876 A * 8/1956 Schulman .................. 106/607
3,900,102 A   8/1975 Hurst
(Continued)

FOREIGN PATENT DOCUMENTS

WO         95-010574        4/1995

OTHER PUBLICATIONS

Form PCT/ISA/210, International Search Report for International Application No. PCT/US2011/031158, dated Oct. 21, 2011, 3 pages.
(Continued)

*Primary Examiner* — Mark Wendell
*Assistant Examiner* — Matthew J Smith
(74) *Attorney, Agent, or Firm* — Craig K. Leon; Stephan P. Williams

(57) ABSTRACT

Disclosed is a waterproofing membrane that comprises a carrier sheet, a pressure sensitive adhesive layer on one surface of the carrier sheet, and a protective coating layer on the adhesive layer. The protective coating layer comprises a highly reflective protective coating layer operative to bond to concrete cast against it, particularly one that is produced from an aqueous coating comprising an acrylic emulsion, a filler, and a white pigment. The pigment volume concentration of the filler plus white pigment is greater than or equal to 55% by volume. The protective coating layer protects the membrane against weather exposure, tolerates foot traffic and strongly adheres to concrete cast against it. Also disclosed is a waterproofing membrane comprising a carrier sheet, a pressure sensitive adhesive layer, a protective coating layer, and a highly releasable bonding layer. The preferred highly releasable bonding layer comprises nanoscale silica and a binder.

12 Claims, 2 Drawing Sheets

(51) Int. Cl.
   *E01D 19/08* (2006.01)
   *E04G 21/00* (2006.01)
   *E04B 1/76* (2006.01)

(52) U.S. Cl.
   CPC ........... *E04G 21/00* (2013.01); *C09J 2205/114* (2013.01); *C09J 2401/005* (2013.01); *C09J 2425/005* (2013.01); *C09J 2429/005* (2013.01); *C09J 2431/005* (2013.01); *C09J 2433/005* (2013.01); *C09J 2471/005* (2013.01); *C09J 2479/025* (2013.01); *C09J 2483/005* (2013.01); *E04B 2001/7691* (2013.01)
   USPC ........................................... 52/411; 428/351

(56) References Cited

U.S. PATENT DOCUMENTS

| | | | |
|---|---|---|---|
| 4,041,000 A * | 8/1977 | Farcnik | ........................ 524/432 |
| 4,172,830 A | 10/1979 | Rosenberg et al. | |
| 4,215,160 A | 7/1980 | Rosenberg et al. | |
| 4,751,122 A | 6/1988 | May | |
| 4,994,328 A | 2/1991 | Cogliano | |
| 5,254,661 A | 10/1993 | Wilson | |
| 5,270,373 A * | 12/1993 | Wiercinski et al. | ........... 524/423 |
| 5,271,781 A | 12/1993 | Anno et al. | |
| 5,316,848 A | 5/1994 | Bartlett et al. | |
| 5,496,615 A | 3/1996 | Bartlett et al. | |
| 6,500,520 B1 | 12/2002 | Wiercinski et al. | |
| 6,939,922 B2 * | 9/2005 | Beckley et al. | ............. 525/329.7 |
| 7,634,877 B2 * | 12/2009 | Wiercinski | ..................... 52/411 |
| 8,168,032 B2 * | 5/2012 | Kalkanoglu et al. | ........... 156/276 |
| 2005/0196590 A1 | 9/2005 | Seth et al. | |
| 2011/0056411 A1 * | 3/2011 | Schmidt et al. | ................ 106/806 |

OTHER PUBLICATIONS

Form PCT/ISA/237, Written Opinion of the International Searching Authority for International Application No. PCT/US2011/031158, dated Oct. 21, 2011, 5 pages.

\* cited by examiner

WATERPROOFING MEMBRANE

CROSS-REFERENCE TO RELATED APPLICATION

This application is a 371 of PCT/US2011/031158 filed Apr. 5, 2011, which claims the benefit of U.S. Provisional Application No. 61/328,899 filed Apr. 28, 2010.

FIELD OF THE INVENTION

The present invention relates to a pre-applied waterproofing membrane that will adhere to concrete applied against its surface.

BACKGROUND OF THE INVENTION

Sheet-like waterproofing membrane laminates are well-known for application to concrete and other substrates. These laminates typically comprise a carrier sheet and a pressure sensitive adhesive layer. In many applications, the waterproofing sheet material is applied to a concrete substrate that has already been formed, such as a building foundation. In such a case, the adhesive layer of the membrane is applied against the cured concrete surface. In another technique, the waterproofing membrane is affixed to the concrete form or lagging with the carrier sheet against the lagging and the adhesive portion facing toward the cavity in which the concrete is poured. The adhesive portion of the membrane will adhere to the freshly poured concrete, thus providing a fully adhered waterproofing membrane on the cured concrete surface after the lagging is removed. This technique is sometimes referred to as "blind side" (or pre-applied) waterproofing. A similar process may be used on horizontal surfaces where the membrane is applied to compacted soil or gravel or to a concrete slab, with the adhesive portion facing upward, then casting concrete against the membrane.

In addition to the carrier sheet and pressure sensitive adhesive layer, typical commercial waterproofing membranes include a removable release sheet that is used to prevent the adhesive portion of the membrane from adhering to the carrier sheet or other portion of the membrane when the membrane is rolled up. This release sheet must be removed from the membrane prior to or during installation and disposed in the trash, thus creating environmental waste.

U.S. Pat. No. 3,900,102 (Hurst) discloses one such membrane comprising a polyethylene support sheet, a bituminous adhesive and a releasable siliconized paper for protecting the adhesive. The release paper is removed as the membrane is unrolled and adhered to a building substrate (see Hurst FIG. 4). U.S. Pat. No. 4,751,122 (May) discloses a membrane laminate that includes a sheet-like paper substrate with a release coating (e.g., silicone) on one face and a waterproofing pressure sensitive adhesive on the other face. This membrane also includes a removable strip along the edge which, when removed, permits overlapping seams to adhere. U.S. Pat. No. 4,172,830 (Rosenberg) and U.S. Pat. No. 4,215,160 (Rosenberg) disclose paperless membrane laminates that include a silicone release coating on the outer surface of the carrier sheet to prevent the adhesive layer from adhering to the carrier sheet when the membrane is rolled up. U.S. Pat. No. 5,254,661 (Wilson) discloses a similar type of paperless membrane laminate in which the release coating is a water-based silicone emulsion. During installation, edge portions of the release coating may be removed by wet abrasion to permit adhesion of overlap seams of adjacent membranes.

U.S. Pat. No. 4,994,328 (Cogliano) discloses a waterproofing membrane capable of adhering to freshly poured concrete (i.e., blind-side or pre-applied waterproofing). The membrane has a bituminous adhesive layer that is coated with a non-tacky, water-insoluble polymeric coating such as, for example, a polyvinyl alcohol, silica, and glycerin mixture in a weight ratio of 1:10:0.5. The coating purportedly protects the adhesive layer while permitting a strong adhesive bond to freshly poured concrete. However, the coating can be slippery when wet and, thus, not suitable for foot traffic. U.S. Pat. No. 5,316,848 (Bartlett) discloses a similar blind-side waterproofing membrane that includes a carrier layer, a pressure sensitive adhesive layer, and a protective coating on the adhesive layer, wherein the coating may be selected from various types of polymers, preferably an acrylic-based elastomer, such as styrene butyl acrylate. U.S. Pat. No. 5,496,615 (Bartlett) discloses a similar membrane laminate where the protective coating has a finely divided particulate material, such as sand, calcium carbonate, cement, titanium dioxide, etc., dusted thereon. The Bartlett patents suggest it is preferred that the protective coating is elastomeric (meaning it will stretch to at least twice its original length and return to approximately its original length), has a penetration greater than 30 dmm, and includes carbon black. The exemplified Bartlett membranes exhibit poor bond to concrete after exposure to LTV radiation.

U.S. Pat. No. 6,500,520 (Wiercinski) discloses a membrane laminate having a carrier support sheet, an adhesive layer, and embedded on the adhesive layer a layer of granulated inorganic particulates capable of reacting with concrete, such as aluminum oxide trihydrate, silica dioxide, fly ash, blast furnace slag, alkali or alkaline earth metal salts, etc. The particles may be attached to the adhesive layer using a water-soluble material such as ethylene vinyl acetate or polyvinyl alcohol.

Typical commercial waterproofing membranes used for blind-side (or pre-applied) applications include a release sheet and unroll wrong side up with the adhesive portion facing downward. This forces the installer to first unroll then flip over a large, unwieldy membrane prior to installing it. Alternatively, two installers are needed to lift the heavy roll so that it may be unrolled with the correct side facing upward. The need to remove and dispose of a release liner requires additional labor and creates a considerable amount of trash, the disposal of which has significant monetary and environmental costs.

It would be advantageous to provide a waterproofing membrane that binds strongly to concrete cast against its surface, particularly after exposure to sunlight. In addition, it would be advantageous to provide a waterproofing membrane that has an outer surface that will easily tolerate foot traffic, that is not tacky, and that does not wash off, blister or delaminate when exposed to water (i.e., good immersion resistance). It would also be advantageous to provide a waterproofing membrane that has good blocking resistance (i.e., one surface does not adhere to the other surface) so that it does not require a release sheet that must be removed and disposed of at the job site. In addition, it would be advantageous to provide a waterproofing membrane that is right side up (i.e., carrier sheet facing down and adhesive/protective coating facing up) when it is unrolled at the job site. Also, it would be advantageous to provide a waterproofing membrane with an outer layer that is sufficiently hard (lower tack) for good trafficability, yet sufficiently flexible that it will not crack

SUMMARY OF THE INVENTION

The present invention embraces a waterproofing membrane in the form of a sheet-like laminate that comprises a carrier sheet, a pressure sensitive adhesive layer on one surface of the carrier sheet, and a protective coating layer on the adhesive layer. The protective coating layer is highly reflective and operative to bond to concrete cast against it. It has a penetration ≤20 dmm (ASTM D5) and a reflectivity ≥55%, measured by a reflectometer perpendicular to a surface illuminated at a 45° angle. It comprises an acrylic or methacrylic polymer having at least 50 wt % acrylic or methacrylic monomer units and a Tg of −40° C. to 0° C. It further includes a filler and a white pigment, wherein the pigment volume concentration (PVC) of the filler plus white pigment is greater than or equal to 55% by volume. The protective coating layer is produced from an aqueous coating comprising an acrylic emulsion, a filler, and a white pigment.

A preferred embodiment of the invention is a waterproofing membrane comprising a carrier sheet, a pressure sensitive adhesive layer, a protective coating layer, and a highly releasable bonding layer. The preferred highly releasable bonding layer comprises nanoscale silica and a binder.

Although the waterproofing membrane may optionally include a removable release sheet, if desired, it is preferred that the membrane does not include a release sheet. The protective coating layer protects the membrane against weather exposure, tolerates foot traffic and strongly adheres to concrete cast against it. The waterproofing membranes of the present invention have a protective coating layer that contains a high level of filler and white pigment, thus resulting in a high PVC, high reflectivity, low penetration, low tack, good trafficability, good bond to concrete after UV exposure, good blocking resistance and good immersion resistance.

The present invention also embraces a method of waterproofing a concrete structure by applying a waterproofing membrane as defined herein to a building substrate or concrete form with the protective coating layer of the membrane facing the area into which the concrete will be cast, and casting concrete such that it contacts the protective coating layer of the membrane.

DETAILED DESCRIPTION OF THE INVENTION

Figure 1:
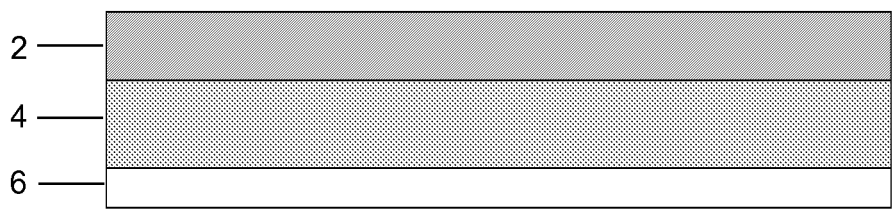
FIG. 1 depicts a cross-section of a waterproofing membrane of the present invention having three layers.

One embodiment of the waterproofing membrane of the present invention is depicted in FIG. 1, which shows a cross-section of the membrane taken along the width of the membrane. Typical commercial membranes are in the form of a sheet-like laminate with a width in the range of about 30 to 185 cm, more typically about 60 to 140 cm, preferably about 80 to 130 cm, and a length of about 5 to 60 m, more typically about 15 to 36 m, and are rolled up into a roll. These membranes generally have a thickness of about 0.15 mm to about 5 mm, more typically about 0.25 mm to about 2.5 mm, preferably about 0.25 mm to about 1.8 mm.

Figure 2:
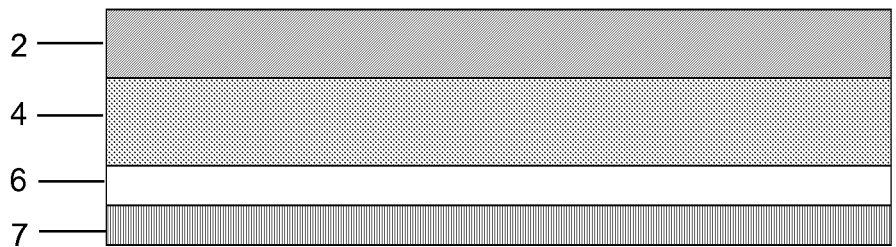
FIG. 2 depicts a cross-section of a preferred waterproofing membrane of the present invention having four layers.

As shown in FIG. 1, the waterproofing membrane comprises at least three laminated layers. The first layer is a carrier sheet 2 and the second layer is an adhesive layer 4, which is adhered to one surface (i.e., a first surface) of the carrier sheet. The third layer of the waterproofing membrane is a protective coating layer 6 on the adhesive layer 4. Optionally, the waterproofing membrane may include a removable release sheet (not shown) on the protective coating layer 6. As depicted, the protective coating layer 6 is on the side of the adhesive layer 4 that is opposite the side of the adhesive layer that is adhered to the carrier sheet 2. The waterproofing membrane may optionally include additional layers of material on either face of the carrier sheet as desired. For example, a second adhesive layer may be adhered to the other surface (i.e., a second surface opposite the first surface) of the carrier sheet (e.g., to enable the membrane to be adhered to a substrate). The adhesive layer 4 is adhered either directly onto a surface of the carrier sheet, or indirectly if there is an optional additional layer of material interposed between the carrier sheet 2 and the adhesive layer 4. Preferably, the protective coating layer 6 will include on its outer surface a highly releasable bonding layer 7, as shown in FIG. 2.

The carrier sheet 2 provides mechanical strength and waterproofing integrity for the membrane. The carrier sheet typically will have a thickness of about 0.05 to 2.0 mm, preferably about 0.3 to 1.0 mm, and should comprise a generally smooth surface, such as is provided by films, sheets, fabrics, and extrusion coated woven and non-woven fabrics. Suitable materials for films and extrusion coatings include polypropylene, polyethylene, ethylene-propylene copolymers, ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC), polyamides and combinations thereof. Polyethylene and polypropylene are preferred. A preferred carrier sheet comprises a thermoplastic film of high density polyethylene (HDPE). Fabrics may be woven or non-woven and may comprise polyethylene, polypropylene, polyethylene terephthalate and polyamide. A woven polypropylene fabric is particularly suitable.

Generally, the carrier sheet is not surface treated to increase the surface tension. However, in some cases it may be desirable to treat the surface of the carrier sheet on which the adhesive will be applied in order to enhance adhesion of the adhesive to the carrier sheet. One such surface treatment option is corona treatment. Preferably, the carrier sheet will not be corona treated, particularly the surface of the carrier sheet that comes in contact with the protective coating layer 6 or the releasable bonding layer 7 (when the membrane is rolled up). Generally, it is preferred that the face of the carrier sheet that contacts the protective layer 6 or the highly releasable bonding layer 7 have a surface tension of 40 dynes/cm or less, preferably 35 dynes/cm or less.

Additives may be incorporated into the carrier material to reduce surface tension. These may be incorporated into the bulk of the material in a separate compounding step. The additives may also be incorporated into the bulk of the material during the melt extrusion process to produce a sheet, film, or extrusion coated fabric.

The adhesive layer 4 may comprise a non-bituminous pressure sensitive adhesive or a rubber modified bitumen pressure sensitive adhesive. The adhesive layer typically will have a thickness of about 0.05 to 2.5 mm, preferably about 0.07 to 2.0 mm, more preferably about 0.1 to 1.0 mm, most preferably about 0.13 to 0.8 mm.

Suitable non-bituminous, or synthetic, pressure sensitive adhesives include butyl rubber based adhesives, polyisobutylene based adhesives, butyl based adhesives, acrylic based adhesives, vinyl ether based adhesives, styrene-isoprene-styrene (SIS) based adhesives, styrene-ethylene-butylene-styrene (SEBS) based adhesives, styrene-butadiene-styrene (SBS) based adhesives, styrene-butadiene rubber (SBR) based adhesives, and combinations thereof. Preferably, the synthetic adhesive is a pressure sensitive hot melt adhesive block copolymer of SIS, SBS or SEBS, most preferably SIS block copolymer. For a more detailed description of pressure sensitive adhesives, see Satas, Handbook Of Pressure Sensitive Adhesive Technology, by Van Nostrand Reinhold Company, Inc. (1982), incorporated herein by reference. Other rubbers include polyisoprene, polybutadiene, natural rubber, polychloroprene rubber, ethylene-propylene rubber, ethylene alpha olefin, nitrile rubbers, and acrylic rubber.

Other suitable non-bituminous synthetic pressure sensitive adhesives may comprise amorphous polyolefins. Amorphous polyolefin (APO) is defined as polyolefin with a degree of crystallinity of less than 30% as measured by differential scanning calorimetry. These polymers can be either homopolymers of propylene or copolymers of propylene with one or more α-olefin comonomer, such as, for example, ethylene, 1-butene, 1-hexene, 1-octene and 1-decene. The APO polymers of the types herein described above are commercially available from Eastman Chemical Company, Kingsport, Tenn., under the trade name designation Eastoflex or from Huntsman Corporation, Houston, Tex., under the trade name designation Rextac or from Degussa Corporation, Parsipanny, N.J., under the trade name designation Vestoplast. Like rubber based adhesives, these are also combined with a tackifier and plasticizer to produce a pressure sensitive adhesive. See Eastman bulletin "Pressure-Sensitive Adhesives Based on Amorphous Polyolefin From Eastman Chemical Company"

Hot melt adhesives based on amorphous polyolefins are suitable as well. In comparison to pressure sensitive adhesives these are not tacky and generally comprise only APO, tackifier, and polyolefin wax. Refer to Eastman brochure "Formulating Hot Melt Adhesives Based on Epolene Polymers." Hot melt adhesives based on ethylene vinyl acetate are also suitable. See "DuPont Elvax for Adhesives, Sealants, and Wax Blends."

The non-bituminous or synthetic pressure sensitive adhesive can optionally contain typical additives, such as light absorbers (e.g., carbon black, benzotriazoles, hydroxyphenyl-triazine, benzophenones, etc.), light stabilizers (e.g., hindered amines), antioxidants (e.g., hindered phenols), fillers (e.g., calcium carbonate, silica, titanium dioxide, etc.), plasticizers, rheological additives, and mixtures thereof. Preferred synthetic adhesives contain light absorbers, light stabilizers, and antioxidants.

A rubber modified bitumen pressure sensitive adhesive may also be used. All of the rubbers listed above (e.g., SIS, SBS, SEBS, SBR, etc.) may be blended with bitumen to produce a pressure sensitive adhesive. The rubber modified bitumen may also typically include a processing oil such as an aromatic, naphthenic or paraffinic oil. For unfilled adhesives, the wt. % rubber is about 10% to 22%; the wt. % bitumen is about 43% to 90%; and the wt. % processing oil is about 0% to 35%. The pressure sensitive adhesive may also comprise an inorganic filler such as silica, calcium carbonate, talc, or clay. If present, the wt. % filler may be about 0% to 50% of the total.

Generally, for improved adhesion to post cast concrete it is preferred that the pressure sensitive adhesive has a penetration greater than about 30 decimillimeters (dmm) (150 g, 5 sec., 70° F.) as measured according to ASTM D 5-73, incorporated herein by reference.

The protective coating layer 6 has several functions. It protects the membrane against exposure to weather, it tolerates foot traffic, and, most importantly, it operates to bond to concrete cast against it. In a preferred embodiment, it can also prevent the membrane from adhering to itself when the membrane is rolled up, thus making it possible to dispense with the need for a release liner. The protective coating layer is highly reflective and operative to bond to concrete cast against it. The protective coating is produced from an aqueous emulsion comprising an acrylic or methacrylic polymer (or copolymer), a filler and a white pigment, wherein the pigment volume concentration of the filler plus white pigment is greater than or equal to 55% by volume of total solids (dry). Preferably, the protective coating layer (or more correctly the polymer or copolymer therein) has a Tg of −40° C. to 0° C., a penetration ≤20 dmm (ASTM D5), and a reflectivity ≥55%, measured by a reflectometer perpendicular to a surface illuminated at a 45° angle. Preferably, the acrylic or methacrylic polymer (or copolymer) has at least 50 wt % acrylic or methacrylic monomer units.

Although not preferred, the protective coating layer 6 may optionally include a coating or dusting of finely divided inorganic particulate material on its outer exposed surface. The particulate inorganic material serves to protect the adhesive layer 4 and the protective coating layer 6 from the elements prior to casting concrete against it. Preferably, it also improves the adhesion to post-cast concrete. The particulate inorganic material may include calcium carbonate, sand, silicate sand, cement (including Portland cement, white Portland cement, calcium aluminate cement, calcium sulfoaluminate cement), talc, titanium dioxide, slate dust, granite dust, clay, fly ash, slag, metakaolinite, alumina trihydrate, hydrated ground cement (including Portland cement, white Portland cement, calcium aluminate cement, calcium sulfoaluminate cement), partially hydrated cement (including Portland cement, white Portland cement, calcium aluminate cement, calcium sulfoaluminate cement), and mixtures of two or more of these materials. Preferably, the particulate inorganic material will have an average particle size in the range of about 0.1-1000 μm, and more preferably in the range of about 0.2 to 100 μm.

Although not required and not preferred, the waterproofing membrane may include a removable release sheet (not shown) on the protective coating layer 6. The release sheet comprises a film or paper that is coated with a release agent, preferably a silicone. The film may comprise polyethylene, polypropylene, polyethylene terephthalate, or polyamide. A paper release sheet may also be coated with a polyolefin layer prior to being coated on the polyolefin face with a silicone release agent. The thickness of the release sheet is typically about 0.01-0.13 mm (about 0.5-5 mils).

The waterproofing membrane may be manufactured in a continuous web coating operation with two coating stations. Pressure sensitive adhesive is applied at one coating station and the protective coating layer is applied at the second coating station. The pressure sensitive adhesive may be coated on to the carrier sheet as a hot melt by a coating device selected from a list including knife over roll coater, slot die coater, or roll coater. This two layer construction comprising a carrier sheet and the pressure sensitive adhesive may be cooled. Then the protective coating layer may be coated (e.g., by hot melt, solvent or emulsion) onto the exposed face of the pressure sensitive adhesive by a coating device selected from the list including knife over roll coater, slot die coater, or roll coater. The protective coating layer may be coated at the same width as the pressure sensitive adhesive or alternatively, it may be coated at a slightly narrower width than the pressure sensitive adhesive layer, leaving one edge of the pressure sensitive adhesive layer uncoated. This narrow uncoated area, referred to as selvedge, is operable to form an adhesive overlap between two adjoining sheets of membrane. The exposed pressure sensitive adhesive edge may be laminated to a silicone coated release strip that, when removed, will form an adhesive overlap between two adjoining sheets of membrane. In the final step the membrane is wound into a roll.

As an alternative construction method, any of the methods may be used that are described in copending application PCT/US2009/06134, filed on Oct. 20, 2009 (now WO 2010/048198), the disclosure of which is incorporated herein by reference.

The protective coating layer is produced from an aqueous emulsion comprising an acrylic or methacrylic polymer (or copolymer), a filler, and a white pigment. The polymer in the emulsion comprises, as polymerized units, at least one acrylic or methacrylic monomer, or a combination thereof. Preferably, the polymer comprises, as polymerized units, at least 50 wt %, more preferably at least 75 wt %, of the acrylic or methacrylic monomer. Preferably, the polymer emulsion is prepared by polymerizing one or more alkyl acrylates and/or alkyl methacrylates containing 1-18 carbons per alkyl group. Suitable monomers include, for example, methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate, behenyl methacrylate, and the like. "Alkyl", as used herein includes straight chain, branched and cyclic alkyl groups.

In one embodiment of the invention, the (meth)acrylic monomer is co-polymerized with at least one different monomer. By (meth)acrylic is meant herein an acrylic monomer or methacrylic monomer, or combination thereof. Suitable co-monomers include, for example, alpha olefinically unsaturated carboxylic acids containing 3-5 carbons, and esters thereof containing 4-20 carbons; mono-unsaturated dicarboxylic acids containing 4-8 carbons; nitriles selected from alpha olefinically unsaturated nitriles containing 3-5 carbons; polymerizable ethylenically unsaturated mono- and di-carboxylic acids containing 3-8 carbons, and esters thereof containing 4-20 carbons; vinyl esters of carboxylic acids containing 4-22 carbons; a olefins containing 2-12 carbons; styrene and styrene derivatives; and other polyfunctional monomers. Preferred co-monomers include styrene, acrylonitrile, and acrylic acid.

The polymer (or copolymer) in the protective coating layer has a glass transition temperature (Tg) of from −40° C. to 0° C., as calculated using the Fox equation (1) (T. G. Fox, Bull. Am. Physics Soc., Volume 1, Issue No. 3, page 123 (1956)). That is, for calculating the Tg of a copolymer of monomers M1 and M2, $$1/Tg(\text{calc.}) = w(M1)/Tg(M1) + w(M2)/Tg(M2)$$

wherein
Tg(calc.) is the glass transition temperature calculated for the copolymer;
w(M1) is the weight fraction of monomer M1 in the copolymer;
w(M2) is the weight fraction of monomer M2 in the copolymer;
Tg(M1) is the glass transition temperature of the homopolymer of M1; and
Tg(M2) is the glass transition temperature of the homopolymer of M2, with all temperatures being measured in ° K.

Examples of suitable emulsion binders that are commercially available include Acronal 5400 (BASF) and UCAR 123 (Arkema), both of which are styrene-acrylic copolymer emulsions.

The protective coating layer provides for good bond to concrete after UV exposure because it is a highly reflective layer that provides for a cooler membrane (which minimizes the rate of pressure sensitive adhesive degradation. Degradation of the pressure sensitive adhesive reduces bond to concrete) when the membrane is exposed to sunlight as opposed to the use of coatings of low reflectivity which provide for a warmer membrane temperature when the membrane is exposed to sunlight.

Reflectivity is gauged with a reflectometer (NOVO-SHADE 45/0 reflectometer), with the test surface illuminated from a 45° angle and the intensity of scattered light measured at the perpendicular (i.e. 0°). Data is recorded on a grey scale where black is 0% and white is 100%. Only shading is measured, irrespective of color, and is referred to as whiteness. Reflective coatings of the present invention exhibit a value that is greater than or equal to 55%. Preferred coatings exhibit a value that it is greater than 65%.

The protective coating layer comprises inorganic filler and white pigment. The volume fraction, in the protective coating layer, of filler plus white pigment as a volume % of total solids is referred to as the pigment volume concentration (PVC) and is 55% to 90%. The preferred PVC is 55% to 75%. A most preferred PVC is 60% to 70%.

Suitable inorganic fillers include calcium carbonate, silica, diatomaceous earth, barytes, magnesium silicates, talc, clay, and alumina trihydrate. White fillers are preferred. Calcium carbonate is a preferred inorganic filler. The average particle size of the filler is 1 μm to 50 μm, preferably 3 μm to 25 μm.

White pigments are included to increase the reflectivity of the protective coating layer. A pigment that efficiently scatters visible light, thereby imparting whiteness, brightness and opacity when incorporated into a coating is preferred. Preferred pigments include titanium dioxide, antimony oxide, zinc sulfide, and zinc oxide. An organic hollow sphere pigment, Ropaque, produced by Rohm and Haas, may also be used. Titanium dioxide is most preferred. Titanium dioxide ($TiO_2$) and other white pigments opacify paint films primarily by diffusely reflecting light. This reflection occurs because the white pigment scatters or bends light strongly. If there is enough white pigment in a paint film, almost all visible light striking it (except for a very small amount absorbed by vehicle or pigment) will be reflected, and the film will appear opaque, white, and bright. The volume % of white pigment as a volume % of filler plus white pigment is 5% to 30%.

A high PVC provides for good adhesion between the protective layer and the pressure sensitive adhesive when the membrane is immersed in water. A protective coating formed from an aqueous emulsion with no inorganic material or a low level of inorganic material exhibits poor adhesion to the pressure sensitive adhesive under immersion conditions. The PVC also effects protective layer flexibility and the ability to easily unroll a roll of membrane that does not comprise a release liner (referred to as blocking resistance). If the PVC is too low the roll of membrane will not be easily unwound as the bond strength between the protective layer and the backside of the carrier, in roll form, will be high. Flexibility is enhanced as the PVC is decreased. Flexibility is needed to minimize cracking of the protective coating layer during manufacturing, thermal cycling, and installation. The protective coating layer will be strained when the membrane is unrolled, during installation to form details and overlaps and as a result of foot traffic during installation.

Resistance to blocking may be enhanced by texturing the protective layer. The texturing provides for a lower level of contact between the protective coating layer and the carrier sheet when the membrane is wound into a roll. The lower level of contact area provides for greater resistance to blocking then for a smooth surface of the same composition. Various texturing patterns may be used, such as those shown in FIG. 3. The lower level of contact between the textured protective coating layer 6 and the carrier sheet 2 is illustrated in FIG. 4, which illustrates two membrane surfaces in contact as in a roll. The textured protective coating layer may also exhibit additional flexibility as well as blocking resistance in comparison to smooth layer.

The protective coating layer may also contain surfactants, thickeners, antioxidants, UV stabilizers, UV absorbers, biocides, defoamer, wetting agents, and/or coalescing agents. Antioxidants and UV absorbers are operative to protect the coating and the pressure sensitive adhesive against degradation. UV absorbers are selected from a list including benzotriazoles, hydroxyphenyl-triazines, and benzophenones. Antioxidants are selected from a list including hindered amines and hindered phenols. Tinuvin 292 is a preferred antioxidant. Tinuvin DW 400, Tinuvin 1130, Tinuvin 213, and Tinuvin 571 are preferred UV absorbers. The wt % of UV absorber on total solids is 0.1% to 1%. The wt % of antioxidant on total solids is 0.1 to 1%. Thickeners may include water soluble thickeners, alkali soluble thickeners and clay-based thickeners.

The protective coating layer, upon application to the pressure sensitive adhesive layer, has a dry (solids only) weight that ranges from 10 g/m$^2$ to 200 g/m$^2$, preferably 25 g/m$^2$ to 100 g/m$^2$. If the protective coating layer is textured, the coating weight is 60 g/m$^2$ to 400 g/m$^2$, preferably 90 g/m$^2$ to 300 g/m$^2$.

The penetration of the protective coating layer, as measured according to ASTM D5 (150 g/5 sec), is less than or equal to 20 dmm.

In a most preferred embodiment, the waterproofing membrane of the present invention will include a releasable bonding layer 7, as depicted in FIG. 2. Four different types of materials may be used as the highly releasable bonding layer 7. These include water soluble polymers, alkali soluble polymers, homopolymers or copolymers of polyvinyl acetate, and a layer comprising a binder and a nanoscale silica. The latter two are preferred. A highly releasable bonding layer comprising a binder and nanoscale silica is most preferred.

In one embodiment, the highly releasable bonding layer 7 is hydrophilic and will generally comprise a water soluble polymer. Suitable water soluble polymers may include polyvinyl alcohol (PVOH), polyethylene oxide (PEO), water soluble cellulosic polymers (e.g., hydroxypropyl methyl cellulose, hydroxyethyl cellulose), hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums. Since this highly releasable bonding material is hydrophilic, it may be completely or partially removed by exposure to water (e.g., rainfall) after the membrane is installed, but before concrete is cast against it. However, concrete will strongly adhere to any residual bonding material and/or to the protective coating.

In another embodiment, the highly releasable bonding layer 7 may comprise an alkali soluble polymer. In accordance with the present invention, an alkali soluble polymer is defined as a polymer that is insoluble or non-swellable below pH 5 and soluble, or at least partially soluble or swellable, above pH 8.

An alkali soluble polymer bonds well to concrete. Without being bound by any theory, it is postulated that a proposed mechanism for bond formation between the alkali soluble polymer and concrete can be described as follows. When concrete is cast against the alkali soluble polymer layer it may dissolve, partially dissolve, swell, or partially swell. The polymer is rendered soluble or swellable by reaction of the hydrophilic monomers with alkaline species like calcium hydroxide within the concrete. Anhydrides and carboxylic acids both react with calcium hydroxide to form calcium carboxylate salts. Phenol will also react with calcium hydroxide to form a salt. In one of these states the polymer layer may diffuse or partially diffuse into the concrete. Once the concrete sets, the polymer layer and membrane are bonded to the concrete. Alternatively, only the surface (or a thin layer at the surface) of the alkali soluble polymer layer may be affected by reaction with calcium hydroxide in the concrete. While these calcium salts may be insoluble, partially soluble, or swellable, it is believed the salt formation contributes to the bond between the membrane and concrete cast and cured against the bonding material surface of the membrane.

The alkali soluble polymer may comprise one or more hydrophilic monomers and one or more hydrophobic monomers. Hydrophilic monomers are selected from a list including maleic anhydride, a combination of maleic anhydride and a mono-ester/monocarboxylic acid, methacrylic acid, acrylic acid, and vinyl phenol. Hydrophobic monomers are selected from a list including acrylic esters, methacrylic esters, styrene, alpha methyl styrene, alkenes, ethylene, propylene, isobutylene, vinyl chloride, and octadecene.

One type of alkali soluble polymer includes styrene maleic anhydride copolymers such as those manufactured by Sartomer. The ratio of styrene to maleic anhydride ranges from 1:1 to 8:1. The number average molecular weight ranges from 2000 to 12,000. Most preferred is SMA 3000 with a styrene: maleic anhydride ratio of 3:1.

Another type of alkali soluble polymer includes combinations of styrene maleic anhydride and mono-ester/monocarboxylic acid such as those manufactured by Sartomer. The acid value in milligrams of KOH per gram of polymer ranges from 90 to 300. The number average molecular weight ranges from 2000 to 6000. Most preferred are SMA 2625 and SMA 3840.

Another type of alkali soluble polymer includes acrylic acid and styrene and/or alpha-methyl styrene type polymers manufactured by BASF under the trade name of Joncryl. These include Joncryl 680 and Joncryl 682.

An additional type of alkali soluble polymer includes reaction products of hydroxypropyl-methyl cellulose such as those manufactured by Shin-Etsu under the trade name of AQOAT including AQOAT ASHG. This is hydroxypropyl methylcellulose acetate succinate.

Another type of alkali soluble polymer includes copolymers of methacrylic acid and methylmethacrylate such as those manufactured by Evonik under the trade name EUDRAGIT®. Most preferred is EUDRAGIT® S 100.

Another type of alkali soluble polymer includes acrylic acid-ethyl acrylate-methyl methacrylate copolymer such as that manufactured by Lubrizol under the trade name Avalure. Most preferred is Avalure 315. A further type of preferred alkali soluble polymer is a copolymer of methylmethacrylate, ethyl methacrylate and acrylic acid. This is commercially available from Lubrizol as Carboset 526. An additional type of preferred alkali soluble polymer is a copolymer of ethyl acrylate, methylmethacrylate, and acrylic acid. This is commercially available from Lubrizol as Carboset 525.

Another example of an alkali soluble polymer is a rosin acid. Yet another example of an alkali soluble polymer is a phenolic resin, such as a condensation product of phenol and formaldehyde. Suitable phenolic resins include phenolic novolac resins such as those manufactured by Georgia-Pacific. Most preferred is Georgia-Pacific resin CK-2400.

Alkali soluble polymers may be applied to a web in a continuous process as a solution of the alkali soluble polymer in an organic solvent, as a solution in aqueous ammonia, or as an aqueous emulsion. The aqueous emulsion is often referred to as an alkali soluble emulsion or ASE. At low pH the polymer is in the form of an aqueous emulsion. At high pH the polymer dissolves to form an aqueous solution.

In a preferred embodiment, the highly releasable bonding layer comprises a homopolymer or a copolymer of polyvinyl acetate (PVAc). The preferred polymer is polyvinyl acetate homopolymer. Solid polyvinyl acetate homopolymers (100% solids) are available from Wacker Chemie AG and Wacker Chemical Corporation under the trade name Vinnapas. The weight average molecular weight ranges from 10,000 g per mole to 500,000 g per mole, preferably from 20,000 g per mole to 350,000 g per mole. Typically, these will have a glass transition temperature in the range from 33° C. to 44° C. depending on the molecular weight. Generally, the higher molecular weight polymers have higher glass transition temperatures. Other 100% solids polyvinyl acetate homopolymers are also manufactured by McGean. Polyvinyl acetate emulsion may be used as well, such as, for example, polyvinyl acetate emulsion produced by Celanese under the trade name Dur-O-Set. Polyvinyl acetate emulsions are preferred as highly releasable bonding layers as these are manufactured with aqueous (and not solvent-based) coatings. The coating weight of a highly releasable bonding layer comprising polyvinyl acetate is 1 g/m$^2$ to 15 g/m$^2$, preferably 2 g/m$^2$ to 10 g/m$^2$, more preferably 3 g/m$^2$ to 5 g/m$^2$.

In a more preferred embodiment, the highly releasable bonding layer comprises nanoscale silica and a binder. Preferably, the coating weight (on the membrane surface) of a highly releasable bonding layer comprising nanoscale silica plus binder is 1 g/m$^2$ to 15 g/m$^2$, preferably 2 g/m$^2$ to 10 g/m$^2$, more preferably 3 g/m$^2$ to 6 g/m$^2$. The binder may include any of the polymers identified above for use in the releasable bonding layer—i.e., a water soluble polymer, an alkali soluble polymer, or a homopolymer or copolymer of polyvinyl acetate. However, the polymer binder must be soluble or dispersible in water because an aqueous mixture of the silica dispersion and binder is needed to produce a highly releasable bonding layer. Preferred binders include aqueous dispersions of hydrophobic polymer emulsions. A preferred aqueous polymer emulsion binder is an emulsion of polyvinyl acetate homopolymer such as that produced by Celanese under the trade name Dur-O-Set.

Aqueous nanoscale silica dispersions are sold by W.R. Grace & Co. under the trade name Ludox. The nanoscale silica particles in LUDOX colloidal silica are discrete uniform spheres of silica with no porosity or detectable crystallinity. Most are dispersed in an alkaline medium which reacts with the silica surface to produce a negative charge. Because of the negative charge, the particles repel one another resulting in stable products between pH 8-11. Some grades contain silica with specially modified surfaces to give broader stability (pH 4-11). During drying, the hydroxyl groups on the surface of the particles condense by splitting out water to form siloxane bonds (Si—O—Si) resulting in coalescence and interbonding. Particle size ranges from 5 nm (nanometers) to 30 nm. The volume percentage of silica, as a percentage of silica plus polymer binder, is 30% to 70%, preferably 45% to 65%. It should be noted that the size of the silica particles is much smaller than the particle size of polymer particles in commercial aqueous emulsions, where such polymer particles typically may be approximately 200 nm (0.2 μm) or more. Without being bound by theory, it is believed that the ability of the silica particles to coalesce upon drying, combined with the high volume fraction of silica and the difference in particle size between the silica particles and the polymer particles, produces a releasable bonding layer having a continuous silica phase. Furthermore, it is believed that the silica particles are covalently bonded to one another to form the continuous network.

The highly releasable bonding layer is produced from an aqueous or non-aqueous coating composition. Aqueous coatings are preferred. The coating is aqueous if the highly releasable bonding layer comprises a water soluble polymer, an aqueous emulsion, or nanoscale silica. Aqueous or non-aqueous coating compositions may be used to produce highly releasable bonding layers comprising an alkali soluble polymer, a polyvinyl acetate homopolymer, or a copolymer of polyvinyl acetate.

In a preferred embodiment the highly releasable bonding layer is produced from an aqueous composition comprising an emulsion of polyvinyl acetate. In another preferred embodiment the highly releasable bonding layer is produced from an aqueous composition comprising an emulsion of polyvinyl acetate and an aqueous dispersion of nanoscale silica.

Another embodiment of the invention is a process to manufacture a waterproofing membrane of FIG. 1 with a smooth protective coating layer 6 comprising the steps:

apply a mixture comprising emulsion, filler, and pigment, onto a plastic film, pass through a heated oven to dry, producing a protective coating layer 6 coated onto the plastic film, and wind into a roll;

coat a hot melt pressure sensitive adhesive 4 onto the carrier sheet 2;

unwind the two layer laminate comprising the protective coating layer 6 and the plastic film;

laminate the protective coating layer 6 face of the two layer laminate to the pressure sensitive adhesive 4;

remove the plastic film from the protective coating layer 6, leaving the protective coating layer adhered to the pressure sensitive adhesive 4;

wind the three layer composite comprising the protective coating layer 6, pressure sensitive adhesive 4, and carrier sheet 2 into a roll.

Another embodiment of the invention is a process to manufacture a waterproofing membrane of FIG. 1 with a smooth protective coating layer 6 comprising the steps:

coat a hot melt pressure sensitive adhesive 4 onto the carrier sheet 2;

optionally cool the carrier sheet 2/adhesive 4 combination;

apply a mixture comprising emulsion, filler, and pigment, onto the pressure sensitive adhesive 4 to form a protective coating layer 6;

dry the protective coating layer by heating in an oven and/or via heat from the hot melt coated pressure sensitive adhesive 4 to produce protective coating layer 6 coated on the pressure sensitive adhesive 4;

wind the membrane comprising protective coating layer 6, pressure sensitive adhesive 4, and carrier sheet 2 into a roll.

All of the steps above may be performed in a single manufacturing operation. Thus, the carrier sheet 2 is unwound from an unwind stand and the adhesive layer 4 is applied to the carrier sheet as a hot melt. A hot melt coater may be a slot die, knife over roll coater or hot melt roll coater. The adhesive coated carrier may then be optionally cooled by contact with a heat exchanger. Optionally, a narrow release layer may be applied along one edge of the pressure sensitive adhesive layer. Next an aqueous mixture comprising emulsion, filler, and pigment is coated onto the pressure sensitive adhesive layer with a coater that may be a slot die coater, knife over roll coater, curtain coater, or roll coater. The aqueous mixture is supplied to the coater via metering pump from storage tanks. The protective coating layer is dried in an oven. The 3 layer membrane is then wound into rolls of suitable size for application.

Another embodiment of the invention is a process to manufacture a waterproofing membrane of FIG. 1 with a smooth protective coating layer 6 comprising the steps:

apply a mixture comprising emulsion, filler, and pigment onto the carrier sheet 2 and dry to form a protective coating layer 6;

coat a hot melt pressure sensitive adhesive 4 on to either side of the carrier sheet 2 coated with protective coating layer 6;

wind the 3 layer laminate comprising protective coating layer 6, pressure sensitive adhesive 4, and carrier sheet 2 into a roll;

when the roll is unwound the protective coating layer 6 releases from the carrier sheet 2 and remains adhered to the pressure sensitive adhesive 4.

The mixture comprising an acrylic emulsion, filler, and pigment may be applied with any one of a number of different types of coaters including a knife over roll coater, a roll coater, or a slot die coater. The pressure sensitive adhesive may be applied with any one of a number of different types of coaters including a slot die coater, roll coater, or a knife over roll coater. The pressure sensitive adhesive is generally applied at a temperature range between 135° C. and 177° C. (275° F. and 350° F.).

Figure 3:
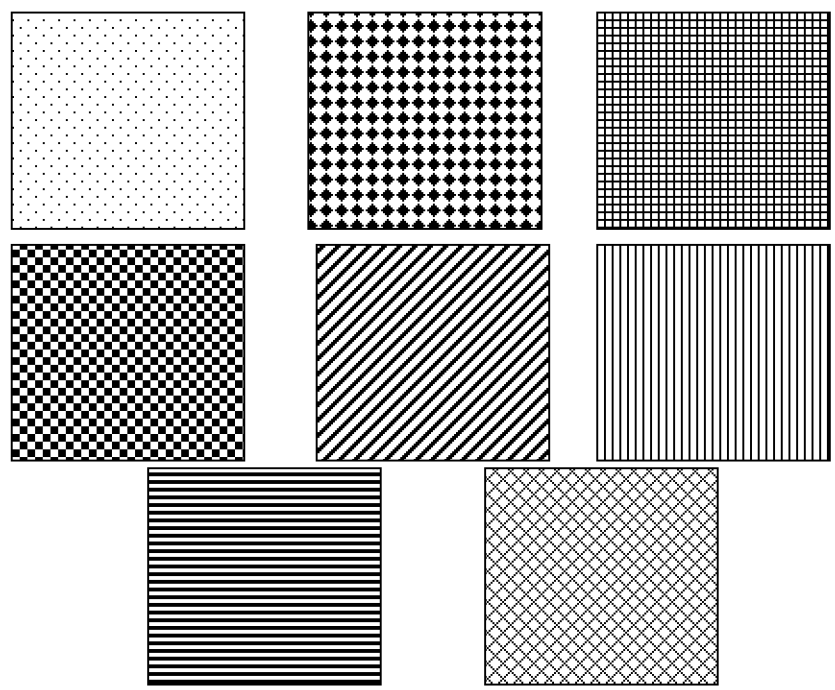
FIG. 3 depicts examples of various texturing patterns that may be applied to the surface of the protective coating layer in an embodiment of the present invention.
Figure 4:
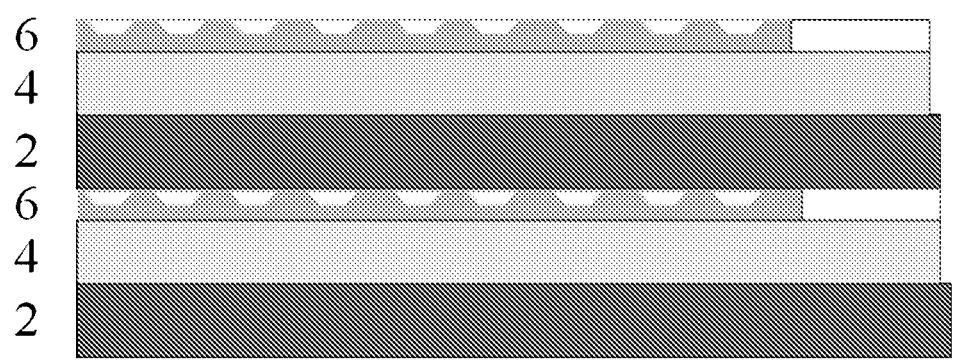
FIG. 4 depicts a cross-section of a preferred waterproofing membrane of the present invention having a protective coating layer with a textured pattern, wherein two membrane surfaces are in contact as in a roll.

Another embodiment of the invention is a process to manufacture a waterproofing membrane of FIG. 1 with a textured protective coating layer 6 (as shown in FIGS. 3 and 4) comprising the steps:

apply a mixture comprising emulsion, filler, and pigment onto a textured plastic film, pass through a heated oven to dry, producing a textured protective layer 6 coated onto the textured plastic film, and wind into a roll;

coat a hot melt pressure sensitive adhesive 4 onto the carrier sheet 2;

unwind the two layer laminate comprising the textured protective coating layer 6 and the textured plastic film;

laminate the face of the textured protective coating layer 6 to the pressure sensitive adhesive 4;

remove the textured plastic film, leaving the textured protective coating layer 6 on the pressure sensitive adhesive 4;

wind the three layer composite comprising the textured protective coating layer 6, pressure sensitive adhesive 4, and carrier sheet 2 into a roll.

Another embodiment of the invention is a process to manufacture a waterproofing membrane of FIG. 1 with a textured protective coating layer 6 (as shown in FIGS. 3 and 4) comprising the steps:

coat a hot melt pressure sensitive adhesive 4 onto the carrier sheet 2;

optionally cool the carrier sheet 2/adhesive 4 combination;

apply a mixture comprising emulsion, filler, and pigment onto the pressure sensitive adhesive 4 in a roll coating process with an engraved roll to produce a textured protective coating layer 6;

dry the coating by heating in an oven to produce a textured protective coating layer 6 coated on the pressure sensitive adhesive 4;

wind the three layer composite comprising the textured protective coating layer 6, pressure sensitive adhesive 4, and carrier sheet 2 into a roll.

All of the steps above may be performed in a single manufacturing operation.

Another embodiment of the invention is a process to manufacture a waterproofing membrane of FIG. 2 comprising the steps:

coat a highly releasable bonding layer 7 to a plastic film and dry;

apply a mixture comprising emulsion, filler, and pigment on to the surface of highly releasable bonding layer 7, dry to produce protective coating layer 6, and wind into a roll;

coat a hot melt pressure sensitive adhesive 4 onto the carrier sheet 2;

unwind the 3 layer laminate comprising the plastic film, highly releasable bonding layer 7, and protective coating layer 6;

laminate the face of protective coating layer 6 of the three layer laminate to the pressure sensitive adhesive 4;

remove the plastic film leaving protective layer 6/highly releasable bonding layer 7 adhered to the pressure sensitive adhesive;

wind the four layer composite comprising highly releasable bonding layer 7, protective coating layer 6, pressure sensitive adhesive 4, and carrier sheet 2 into a roll.

EXAMPLES

The invention may be further illustrated by the following examples, which are not to be construed as limiting the scope of the invention. In these examples, the following materials are used:

Adva 190 is a poly carboxylate dispersant.

Acronal S 400 is a styrene butyl acrylate emulsion (BASF).

Dur-O-Set 310 is a 55% solids polyvinyl acetate emulsion (Celanese).

Tinuvin 292 is a hindered amine light stabilizer (Ciba-Geigy).

Tinuvin 328 is a hydroxyphenylbenzotriazole UV absorber (Ciba-Geigy).

Tinuvin 400 is a hydroxyphenyl-triazine UV absorber (Ciba-Geigy).

Pluronic L81 is an EO/PO surfactant.

Kraton 1163 is an SIS block copolymer.

Escorez 1310 is a C-5 type tackifier (Exxon).

Shellflex 371 is a naphthenic oil.

Irganox 1010 is a hindered phenol antioxidant (Ciba-Geigy).

Ludox AS 40 is a colloidal silica dispersion where the silica has an average particle size of 22 nm and the solids level is 40%.

In addition, the following test procedures are used:

Bond to Concrete:

Since waterproofing membranes are normally subject to exposure to sunlight prior to concrete being cast, it is highly desirable that such membranes maintain their ability to adhere to concrete after such exposure. Adhesion of the membranes to concrete is tested by casting concrete against the outer face (i.e., either the protective coating layer or the releasable bonding layer, if present) of 2 in ×6 in (5 cm×15 cm) membrane samples, allowing the concrete to cure for seven days, then measuring peel adhesion with an Instron mechanical tester at a peel angle of 90° and a peel rate of 2 in (5 cm)/min. Bond to concrete is measured for samples not exposed to UV radiation (initial) and for samples exposed to UV radiation prior to casting concrete, where the UV exposure uses the EMMAQUA accelerated test in which the exposure corresponds to the equivalent of one month UV exposure (28 mj) or two months UV exposure (56 mj).

Blocking Resistance:

Since waterproofing membranes are normally wound into a roll, it is highly desirable to insure that one surface of the membrane (i.e., either the protective coating layer or the releasable bonding layer, if present) does not strongly adhere to the other surface of the membrane (i.e., the carrier sheet). Otherwise, it will be difficult to unwind the roll. To test blocking resistance, a layer of 16 mil (0.4 mm) HDPE is placed on the outer surface (i.e., either the protective coating layer or the releasable bonding layer, if present) of a 2 in ×8 in (5 cm×20 cm) membrane sample, a 2 psi (70 g/cm$^2$) load is placed on top, then this assembly is placed in an oven at 150° F. (66° C.) for 30 days (2 days in the case of Table 5 samples). After cooling to room temperature, each sample is tested with a T-peel test using an Instron mechanical tester using a cross head speed of 10 in (25.4 cm)/min. Blocking is measured as pounds per lineal inch (pli).

Water Immersion:

Since waterproof membranes are normally exposed to weather, such as rain, prior to concrete being cast, it is highly desirable that the protective coating layer does not wash off or delaminate when exposed to water since this would leave the pressure sensitive adhesive layer exposed. To test adhesion of the protective coating layer to the pressure sensitive adhesive under immersion conditions, samples of membrane are immersed in water for 15 days or 30 days, then removed and dried with a paper towel. Adhesion of the protective coating layer (or combination of protective coating layer/releasable bonding layer) to the pressure sensitive adhesive is tested by application of adhesive tape to the surface and assessment of peel adhesion by hand. The layers are well adhered when adhesive failure occurs between the adhesive tape and the surface to which it is adhered.

Membrane preparation. Membranes are prepared using an aqueous based coating formulation for a protective coating layer as shown in Table 1.

TABLE 1

Highly Reflective Protective Coating

| Ingredient | Wt. % |
|---|---|
| TiO2 | 12.9 |
| 5 μm calcium carbonate | 51.4 |
| Adva 190 | 0.5 |
| Acronal S400 | 18.4 |
| Tinuvin 292 | 0.2 |
| Tinuvin 400 DW | 1.6 |
| Water | 14.8 |
| Pluronic L 81 | 0.15 |
| Total | 100.0 |

The coating formulation is prepared in a 1 quart (0.95 l) can with a Cowels dissolver. Water and ADVA 190 are mixed at low speed. While mixing at 500 RPM, titanium dioxide is added followed by calcium carbonate. Mixing speed is increased to 2000 RPM and mixing continued for five minutes. Mixing speed is reduced to 500 RPM. The Acronal emulsion and all remaining ingredients are added and mixing is continued for one more minute.

The coating formulation for the highly releasable bonding layer is prepared by mixing 10 parts Dur-O-Set 310 polyvinyl acetate emulsion and 50 parts water, then mixing with 40 parts of Ludox AS40 colloidal silica.

Two types of membranes are prepared as depicted in FIGS. 1 and 2. The first is a three layer membrane comprising a highly reflective protective coating layer, pressure sensitive adhesive, and carrier sheet. The second is a four layer membrane comprising a highly releasable bonding layer, a protective coating layer, pressure sensitive adhesive, and carrier sheet.

To prepare the first membrane, the protective coating layer is coated onto an untreated 16 mil (0.4 mm) high-density polyethylene (HDPE) sheet with a drawdown bar. The gap for the drawdown bar is selected to achieve the desired coating weight. The coated sheet is first dried for five minutes at room temperature and then dried for 5 minutes in an oven at 150° F. (66° C.).

A sheet of 16 mil (0.4 mm) HDPE is coated with 15 mils (0.38 mm) of SIS based pressure sensitive adhesive (see formulation below).

TABLE 2

| Kraton 1163 | 27.3 |
|---|---|
| Escorez 1310-LC | 56.5 |
| Shellflex 371 Oil | 14.7 |
| Irganox 1010 | 1.0 |
| Tinuvin 328 | 0.5 |

This coated sheet is applied to the coated sheet above with the pressure sensitive adhesive in contact with the protective coating layer. This four layer construction comprising HDPE, protective coating layer, pressure sensitive adhesive and HDPE is peeled into two layers, whereby the protective coating layer releases easily from the HDPE sheet, leaving a three layer structure comprising HDPE sheet, pressure sensitive adhesive and protective coating layer and an uncoated HDPE sheet.

To prepare the second membrane, the highly releasable bonding layer is coated onto an untreated 16 mil (0.4 mm) HDPE sheet with a drawdown bar. The gap for the drawdown bar is selected to achieve the desired coating weight. The coated sheet is first dried for five minutes at room temperature and then dried for 5 minutes in an oven at 150° F. (66° C.). The protective coating layer is coated onto the dry highly releasable bonding layer with a drawdown bar. The gap for the drawdown bar is selected to achieve the desired coating weight. The coated sheet is first dried for five minutes at room temperature and then dried for 5 minutes in and oven at 150° F. (66° C.) to produce a three layer laminate comprising protective coating layer, highly releasable bonding layer, and HDPE sheet.

A sheet of 16 mil (0.4 mm) HDPE is coated with 15 mils (0.38 mm) of SIS based pressure sensitive adhesive, then this coated sheet is applied to the three layer laminate described above, with the pressure sensitive adhesive in contact with the protective coating layer. This five layer construction comprising HDPE sheet, pressure sensitive adhesive, protective coating layer, highly releasable bonding layer, and HDPE sheet is peeled into two layers, whereby the highly releasable bonding layer releases easily from the HDPE sheet leaving a four layer structure comprising HDPE sheet, pressure sensitive adhesive, protective coating layer, and highly releasable bonding layer and an uncoated HDPE sheet.

Seven membranes are prepared with the constructions shown in Table 3. Samples 1 through 6 have three layers as depicted in FIG. 1, while sample 7 has four layers as depicted in FIG. 2.

TABLE 3

| Sample No. | Protective ctg layer Wt (g/m²) | Releasable bndg layer Wt (g/m²) | Blocking pli | Immersion | Bond to concrete (pli) 0 mj | 28 mj | 56 mj |
|---|---|---|---|---|---|---|---|
| 1 | 50 | NA | 0.03 | | 11.6 | | |
| 2 | 50 | NA | | pass 15 day | 11.4 | 11.3 | 11.5 |
| 3 | 68 | NA | 0.04 | pass 30 day | | | |
| 4 | 68 | NA | 0.02/0.065 | | | | |
| 5 | 70 | NA | | pass 15 day | 10.9 | 13.3 | 13.3 |
| 6 | 72 | NA | | | 8.9 | | |
| 7 | 56 | 3.5 | falls off (0) | pass 30 day | 6.7 | | |

As can be seen from the above data, the membranes of the present invention have minimal blocking (adhesion of outer layer to carrier sheet) and good bond to concrete, including good bond to concrete after exposure to UV radiation. In addition, the outer layer does not delaminate or wash off on exposure to water. Bond to concrete is significantly improved in comparison to that for the protective coatings exemplified in U.S. Pat. No. 5,316,848 (Bartlett), where the bond to concrete dropped to about 1 pli after 40 mj exposure.

Membranes are also prepared to demonstrate the effects of pigment volume concentration (PVC) and penetration on blocking resistance. Aqueous based coating formulations for protective coating layers are shown in Table 4. These coatings are used to prepare three layer membranes as depicted in FIG. 1 as previously described. The membrane constructions are delineated in Table 5, along with the PVC, coating weight and penetration of their respective protective coating layers. These membranes are tested for blocking resistance according to the procedure previously described (with two day oven treatment) and those values are also shown in Table 5.

TABLE 4

| | Protective Coating | | | |
|---|---|---|---|---|
| | C | D | E | F |
| PVC | 68.7 | 62.5 | 52.9 | 36.2 |
| TiO₂ | 10.3 | 9.7 | 8.7 | 6.6 |
| 5 μm CaCO₃ | 53.7 | 50.5 | 45.1 | 34.1 |
| Adva 190 | 0.5 | 0.4 | 0.4 | 0.3 |
| Acronal S400 | 19.0 | 23.8 | 31.9 | 48.3 |
| Pluronic L 81 | 0.2 | 0.2 | 0.1 | 0.2 |
| Water | 16.3 | 15.4 | 13.7 | 10.5 |
| Total | 100.0 | 100.0 | 100.0 | 100.0 |

TABLE 5

| Sample No. | Protective Coating | Coating PVC (%) | Coating Wt (g/m²) | 2 day Blocking (pli) | Penetration (dmm) |
|---|---|---|---|---|---|
| 8 | C | 68.7 | 75 | falls off (0) | 3 |
| 9 | C | 68.7 | 59 | falls off (0) | |
| 10 | D | 62.5 | 76 | 0.05 | 7.3 |
| 11 | D | 62.5 | 52 | 0.1 | |
| 12 | E | 52.9 | 70 | slip stick (1.0 pli peaks) | 27.3 |
| 13 | E | 52.9 | 47 | slip stick (1.5 pli peaks) | |
| 14 | F | 36.2 | 57 | slip stick (2.0 pli peaks) | 44 |
| 15 | F | 36.2 | 42 | slip stick (2.5 pli peaks) | |

As can be seen from the above data, blocking resistance is good (peel adhesion values are low) for samples made with high PVC coatings (68.7 and 62.5). These high PVC samples also had low penetration of less than 20 dmm. At lower PVC (and higher penetration), blocking resistance becomes poor with samples exhibiting slip stick behavior, which is an alternation between brittle (as for higher PVC samples) and adhesive failure (1-2.5 pli).

Blocking resistance was also evaluated for compositions described in U.S. Pat. Nos. 5,316,848 and 5,496,615. Membranes like that depicted in FIG. 1 comprising protective coating layer, pressure sensitive adhesive, and carrier sheet are prepared as described above. In one sample, the outer layer comprises only UCAR 123 at 70 g/m². In a second sample, the outer layer comprises UCAR 123, onto the surface of which is dusted calcium carbonate. Blocking resistance is tested as previously described, except with a 10 day oven treatment. The first sample had a peel value of 5 pli and the second sample had a peel value of 1.9 pli. Such high values mean that both membranes will require a release sheet if they are to be wound into a roll.

The water immersion test was also conducted on membranes comprising no filler in the protective coating layer. All membranes comprise 16 mil (0.4 mm) HDPE sheet, 15 mils (0.38 mm) of pressure sensitive adhesive, and approximately 70 g/m² of polymeric protective coating comprising no filler. See table 7. For all of these samples, significant blistering/delamination of the protective coating layer from the pressure sensitive adhesive occurs after one to three days immersion.

TABLE 7

| Emulsion | Polymer Type | Tg (° C.) |
|---|---|---|
| Acronal S400 | acrylic/styrene | −6 |
| Airflex EF500 | vinyl acetate/ethylene | 5 |
| Airflex 7200 | vinyl acetate/ethylene | 0 |
| Flexbond 381 | vinyl acetate/acrylic | 13 |
| Flexbond 325 | vinyl acetate/acrylic | 19 |
| Airflex 400 | vinyl acetate/ethylene | 0 |
| UCAR 357 | vinyl acetate/acrylic | 23 |
| Rhoplex 2438 | acrylic | −22 |
| UCAR 123 | acrylic/styrene | −17 |

The invention claimed is:

1. A waterproofing membrane in the form of a sheet-like laminate, comprising:
   a carrier sheet having first and second opposing surfaces;
   a pressure sensitive adhesive layer having first and second opposing surfaces, one of which is adhered on one surface of the carrier sheet; and
   a protective coating layer having first and second opposing surfaces, one of which is adhered on the surface of the pressure sensitive adhesive layer opposite the surface adhered to the carrier sheet, the protective coating layer having a penetration ≤20 dmm (ASTM D5), and a reflectivity ≥ 55%, measured by a reflectometer perpendicular to a surface illuminated at a 45° angle, and the protective coating layer comprising an acrylic or methacrylic polymer having at least 50 wt % acrylic or methacrylic monomer units and a Tg of −40° C. to 0° C., an inorganic a filler and a white pigment, wherein the pigment volume concentration of the inorganic filler plus white pigment is 55% to 90% by volume, the inorganic filler being selected from the group consisting of calcium carbonate, silica, diatomaceous earth, barites, magnesium silicates, talc, clay and alumina trihydrate, and wherein the white pigment is selected from the group consisting of titanium dioxide, antimony oxide, zinc sulfide, and zinc oxide; and a releasable bonding layer on the protective coating layer, wherein the releasable bonding layer comprises a water soluble polymer, an alkali soluble polymer, or a homopolymer or copolymer of polyvinyl acetate selected from the group consisting of polyvinyl alcohol (PVOH), polyethylene oxide (PEO), water soluble cellulosic polymers including hydroxypropyl methyl cellulose and hydroxyethyl cellulose, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums, styrene maleic anhydride copolymers, copolymers of acrylic acid and styrene and/or alpha-methyl styrene, hydroxypropyl methylcellulose acetate succinate, copolymers of methacrylic acid and methylmethacrylate, acrylic acid-ethyl acrylate-methyl methacrylate copolymer, a copolymer of ethyl acrylate, methylmethacrylate, and acrylic acid, rosin acid, and homopolymers or copolymers of polyvinyl acetate;

the releasable bonding layer further comprising a nanoscale silica in an amount of 30% to 70% by volume of the silica plus polymer, said releasable bonding layer having a coating weight of 1 g/m² to 15 g/m², and said nanoscale silica having a particle size of 5 nm to 30 nm.

2. The waterproofing membrane according to claim 1 wherein the protective coating layer is produced from an aqueous emulsion coating comprising an acrylic or methacrylic polymer having at least 50 wt % acrylic or methacrylic monomer units and a $T_g$ of −40° C. to 0° C., a filler and a white pigment, wherein the pigment volume concentration of the filler plus white pigment is 55% to 90% by volume of total solids.

3. The waterproofing membrane according to claim 1 wherein the pigment volume concentration of the filler plus white pigment is 60% to 70% by volume.

4. The waterproofing membrane according to claim 1 wherein the releasable bonding layer comprises a homopolymer of polyvinyl acetate.

5. The waterproofing membrane according to claim 1 wherein the binder comprises a homopolymer of polyvinyl acetate, and wherein the nanoscale silica is present in an amount of 30% to 70% by volume of the silica and binder.

6. The waterproofing membrane according to claim 1 wherein the protective coating layer has a textured surface.

7. A method of waterproofing a concrete structure comprising applying a waterproofing membrane in accordance with claim 1 to a building substrate or concrete form with the protective coating layer of said membrane facing the area into which the concrete will be cast, and casting concrete such that it contacts the protective coating layer of the membrane.

8. A waterproofing membrane in the form of a sheet-like laminate comprising a carrier sheet, a pressure sensitive adhesive layer on one surface of the carrier sheet, a protective coating layer on the adhesive layer, and a releasable bonding layer on the protective coating layer, wherein the releasable bonding layer comprises nanoscale silica and a binder, wherein the nanoscale silica is present in an amount of 30% to 70% by volume of the silica and binder and the nanoscale silica has a particle size of 5 nm to 30 nm, and wherein the releasable bonding layer has a coating weight of 1 g/m² to 15 g/m² and said binder comprises a water soluble polymer, an alkali soluble polymer, or a homopolymer or copolymer of polyvinyl acetate selected from the group consisting of polyvinyl alcohol (PVOH), polyethylene oxide (PEO), water soluble cellulosic polymers including hydroxypropyl methyl cellulose and hydroxyethyl cellulose, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums, styrene maleic anhydride copolymers, copolymers of acrylic acid and styrene and/or alpha-methyl styrene, hydroxypropyl methylcellulose acetate succinate, copolymers of methacrylic acid and methylmethacrylate, acrylic acid-ethyl acrylate-methyl methacrylate copolymer, a copolymer of ethyl acrylate, methylmethacrylate, and acrylic acid, rosin acid, and homopolymers or copolymers of polyvinyl acetate; and said protective coating layer having a penetration ≤20 dmm (ASTM D5), and a reflectivity ≥55%, measured by a reflectometer perpendicular to a surface illuminated at a 45° angle, and wherein said protective coating layer comprises an acrylic or methacrylic polymer having at least 50 wt % acrylic or methacrylic monomer units and a $T_g$ of −40° C. to 0° C., a filler and a white pigment, wherein the pigment volume concentration of the filler plus white pigment is 55% to 90% by volume; and said protecting coating layer has a textured surface.

9. The waterproofing membrane according to claim 8 wherein the binder comprises a homopolymer of polyvinyl acetate.

10. A waterproofing membrane in the form of a sheet-like laminate, comprising:

a carrier sheet having first and second opposing surfaces;

a pressure sensitive adhesive layer having first and second opposing surfaces, one of which is adhered on one surface of the carrier sheet; and a protective coating layer having first and second opposing surfaces, one of which is adhered on the surface of the pressure sensitive adhesive layer opposite the surface adhered to the carrier sheet, the protective coating layer having a penetration ≤20 dmm (ASTM D5), and a reflectivity ≥55%, measured by a reflectometer perpendicular to a surface illuminated at a 45° angle, and the protective coating layer comprising an acrylic or methacrylic polymer having at least 50 wt % acrylic or methacrylic monomer units and a $T_g$ of −40° C. to 0° C., an inorganic filler and a white pigment, wherein the pigment volume concentration of the inorganic filler plus white pigment is 55% to 90% by volume, the inorganic filler being selected from the group consisting of calcium carbonate, silica, diatomaceous earth, barites, magnesium silicates, talc, clay and alumina trihydrate, and wherein the white pigment is selected from the group consisting of titanium dioxide, antimony oxide, zinc sulfide, and zinc oxide; and a releasable bonding layer having first and second opposed surfaces, one of which is adhered on the surface of the protective coating layer opposite the surface adhered to the pressure sensitive adhesive layer, the releasable bonding layer having a coating weight of 1 g/m² to 15 g/m² and comprising a polymer selected from the group consisting of polyvinyl alcohol (PVOH), polyethylene oxide (PEO), water soluble cellulosic polymers including hydroxypropyl methyl cellulose and hydroxyethyl cellulose, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums, styrene maleic anhydride copolymers, copolymers of acrylic acid and styrene and/or alpha-methyl styrene, hydroxypropyl methylcellulose acetate succinate, copolymers of methacrylic acid and methylmethacrylate, acrylic acid-ethyl acrylate-methyl methacrylate copolymer, a copolymer of ethyl acrylate, methylmethacrylate, and acrylic acid, rosin acid, and homopolymers or copolymers of polyvinyl acetate.

11. The waterproofing membrane according to claim 10 wherein the releasable bonding layer comprises a homopolymer of polyvinyl acetate.

12. The waterproofing membrane according to claim 10 wherein the releasable bonding layer further comprises nanoscale silica in an amount of 30% to 70% by volume of the silica plus polymer.

* * * * *